United States Patent
Ichikawa

(10) Patent No.: US 9,758,707 B2
(45) Date of Patent: Sep. 12, 2017

(54) PUNCTURE SEALING AGENT

(71) Applicant: SUMITOMO RUBBER INDUSTRIES, LTD., Kobe-shi, Hyogo (JP)

(72) Inventor: Naoya Ichikawa, Kobe (JP)

(73) Assignee: SUMITOMO RUBBER INDUSTRIES, LTD., Kobe-Shi, Hyogo (JP)

( * ) Notice: Subject to any disclaimer, the term of this patent is extended or adjusted under 35 U.S.C. 154(b) by 293 days.

(21) Appl. No.: 14/418,764

(22) PCT Filed: Aug. 20, 2013

(86) PCT No.: PCT/JP2013/072129
§ 371 (c)(1),
(2) Date: Jan. 30, 2015

(87) PCT Pub. No.: WO2014/030622
PCT Pub. Date: Feb. 27, 2014

(65) Prior Publication Data
US 2015/0175862 A1    Jun. 25, 2015

(30) Foreign Application Priority Data

Aug. 21, 2012    (JP) .................. 2012-182566

(51) Int. Cl.
*B29C 73/16*    (2006.01)
*C09K 3/10*    (2006.01)

(52) U.S. Cl.
CPC .......... *C09K 3/1006* (2013.01); *B29C 73/163* (2013.01); *C09K 2200/0607* (2013.01); *C09K 2200/0657* (2013.01)

(58) Field of Classification Search
CPC ........................... B29C 73/163; C09K 3/1006
USPC .......................................................... 523/166
See application file for complete search history.

(56) References Cited

U.S. PATENT DOCUMENTS

2010/0331448 A1    12/2010    Ichikawa et al.

FOREIGN PATENT DOCUMENTS

| CN | 101934589 A | 1/2011 |
|---|---|---|
| JP | 2000-272022 A | 10/2000 |
| JP | 2001-198986 A | 7/2001 |
| JP | 2002-294214 A | 10/2002 |
| JP | 4074073 B2 | 4/2008 |
| JP | 2011-6646 A | 1/2011 |
| JP | 2011-12158 A | 1/2011 |
| JP | 2011-12159 A | 1/2011 |

OTHER PUBLICATIONS

English translation of JP-2011-12159-A, dated Jan. 20, 2011.
International Search Report, issued in PCT/JP2013/072129, dated Nov. 19, 2013.

*Primary Examiner* — Edward Cain
(74) *Attorney, Agent, or Firm* — Birch, Stewart, Kolasch & Birch, LLP

(57) ABSTRACT

The present invention provides a tire puncture sealant which exhibits excellent storage stability while having reduced low-temperature viscosity and therefore improved low-temperature injection properties, and also exhibits excellent initial sealing properties and sealing force retention properties. The present invention relates to a tire puncture sealant containing rubber latex and 1,3-propanediol, the 1,3-propanediol being present in a proportion of 55 to 61% by mass of the liquid component.

13 Claims, No Drawings

PUNCTURE SEALING AGENT

TECHNICAL FIELD

The present invention relates to a puncture sealant that is improved in low-temperature viscosity of the sealing liquid and for use in puncture repair systems which sequentially inject a puncture sealant and high-pressure air into a punctured tire through an air valve on the tire wheel.

BACKGROUND ART

There are known systems for emergency repair of punctured tires, including those in which a sealant is injected through an air valve on a tire after the valve core is removed, the valve core is installed after injection, and high-pressure air is then injected until the tire is pumped up to a sufficient pressure for driving (hereinafter referred to also as "discrete type systems"); and those in which a pressure-proof container containing a sealant, and a high pressure-air source such as a compressor are used to inject the sealant into a tire through the air valve and subsequently continuously inject high-pressure air until the tire is pumped up to a sufficient pressure for driving (hereinafter referred to also as "integrated type systems"). Among such puncture sealants, those which contain natural rubber latex in combination with a resin adhesive and an antifreezing agent as disclosed in Patent Literature documents 1 to 4 have been proposed.

Since puncture sealants are used in a wide range of temperatures, they need to maintain injection properties over a range from low to high temperatures. In particular, they need to avoid an increase in viscosity even at low temperatures. However, the viscosity of puncture sealants usually greatly increases at low temperatures, so that such puncture sealants are difficult to inject or they take a long time to inject. Thus, there is a need for methods of suppressing an increase in low-temperature viscosity. Meanwhile, in view of preventing valve clogging due to an increase in viscosity at high temperatures, the mere combination of latex, a resin emulsion, and an antifreezing agent is insufficient because such a puncture sealant, when used at high temperatures, may coagulate in the air valve, making it impossible to increase the pressure to a predetermined level.

CITATION LIST

Patent Literature

Patent Literature 1: JP 2002-294214 A
Patent Literature 2: JP 2001-198986 A
Patent Literature 3: JP 2000-272022 A
Patent Literature 4: JP 4074073 B

SUMMARY OF INVENTION

Technical Problem

The present invention aims to solve the above problems and provide a tire puncture sealant which exhibits excellent storage stability while having reduced low-temperature viscosity and therefore improved low-temperature injection properties, and also exhibits excellent initial sealing properties and sealing force retention properties.

Solution to Problem

The present invention relates to a tire puncture sealant, comprising rubber latex and 1,3-propanediol, the 1,3-propanediol being present in a proportion of 55 to 61% by mass of the liquid component in the tire puncture sealant.

The tire puncture sealant preferably has a solids content of 15 to 30% by mass.

The rubber latex is preferably natural rubber latex.

The natural rubber latex is preferably deproteinized natural rubber.

The tire puncture sealant preferably further comprises a tackifying resin emulsion.

The tire puncture sealant preferably further comprises a nonionic surfactant.

The nonionic surfactant is preferably at least one of a polyoxyalkylene alkyl ether and a polyoxyalkylene alkenyl ether.

The nonionic surfactant preferably has at least one of an ethylene oxide structure and a propylene oxide structure.

The average number of moles of added ethylene oxide or propylene oxide is preferably 10 or greater.

The polyoxyalkylene alkyl ether preferably comprises an alkyl group having 10 or more carbon atoms.

The polyoxyalkylene alkenyl ether preferably comprises an alkenyl group having 10 or more carbon atoms.

The nonionic surfactant is preferably at least one selected from the group consisting of polyoxyethylene stearyl ether, polyoxyethylene lauryl ether, and polyoxyethylene oleyl ether.

The nonionic surfactant preferably has an HLB value of 12 or greater.

Advantageous Effects of Invention

Since the present invention relates to a tire puncture sealant containing rubber latex in combination of 1,3-propanediol, wherein the 1,3-propanediol is present in a proportion of 55 to 61% by mass of the liquid component, the puncture sealant provided exhibits the same storage stability as when propylene glycol is used as an antifreezing agent of a sealant, while having improved low-temperature properties, and therefore the puncture sealant has a good balance of properties. At the same time the puncture sealant of the present invention can exhibit excellent initial sealing properties and sealing force retention properties.

DESCRIPTION OF EMBODIMENTS

The tire puncture sealant of the present invention contains rubber latex and 1,3-propanediol, wherein the 1,3-propanediol is present in a proportion of 55 to 61% by mass of the liquid component.

Examples of the rubber latex include natural rubber latex and synthetic rubber latex. In particular, the puncture sealant of the present invention suitably contains natural rubber latex as a main component in view of the following properties: for example, such a puncture sealant can be injected into a tire without clogging the valve; the puncture sealant is allowed to rapidly fill a puncture hole by driving and then solidified by receiving mechanical stimuli due to the deformation of the tire, so as to seal the puncture hole (initial sealing properties); and the puncture sealant can maintain sealing properties up to a certain travel distance (sealing force retention properties).

In particular, so-called deproteinized natural rubber latex, prepared by removing proteins from the natural rubber latex, may be more preferably used in view of the additional fact that deproteinized natural rubber latex can be prevented from decaying with a smaller amount of ammonia, and therefore corrosion damage to steel cords and generation of a pungent odor, both caused by ammonia, can be prevented. The deproteinized natural rubber latex may be prepared for example by adding a proteolytic enzyme to natural rubber latex to degrade the proteins followed by washing, as described in JP-A H10-217344.

Mention may also be made, as synthetic rubber latex, on the other hand, of polybutadiene rubber, styrene-butadiene rubber, acrylonitrile-butadiene rubber, ethylene-vinyl acetate rubber, chloroprene rubber, vinyl pyridine rubber, and butyl rubber, and modified rubber latexes thereof. The natural rubber latexes and synthetic rubber latexes may be used alone, or two or more types thereof may be used in combination.

The rubber latex is one in which fine particles of solid rubber are emulsified and dispersed in an aqueous medium containing a small amount of surfactant as emulsifier. The rubber latex to be used is usually adjusted to have a rubber solids content of approximately 60% by mass. Moreover, the amount A of the rubber latex (rubber solids) per total mass (100% by mass) of the puncture sealant is preferably in the range from 10% to 40% by mass from the standpoints of initial sealing properties and sealing force retention properties. The lower limit of the amount A is more preferably 20% by mass or more, while the upper limit thereof is more preferably 35% by mass or less.

The puncture sealant of the present invention preferably contains a tackifier. The tackifier is used to increase adhesion between the rubber latex and a tire and thereby improve puncture sealing properties. For example, a tackifying resin emulsion (oil-in-water emulsion) may be used in which fine particles of a tackifying resin are emulsified and dispersed in an aqueous medium containing a small amount of emulsifier. The tackifying resin to be used as the solids in the tackifying resin emulsion may preferably be one that does not coagulate the rubber latex, such as terpene resin, phenolic resin, or rosin resin. Other preferred resins include polyvinyl ester, polyvinyl alcohol, and polyvinyl pyrrolidine.

The amount B of the tackifying resin (solids of the tackifier) per total mass (100% by mass) of the puncture sealant is preferably 2 to 10% by mass. The lower limit of the amount B is more preferably 4% by mass or more, while the upper limit thereof is more preferably 7% by mass or less.

If the amount A of the rubber solids is less than 10% by mass and the amount B of the tackifying resin is less than 2% by mass, the resulting puncture sealant may have insufficient puncture sealing properties and sealing force retention properties. Conversely, if the amount A and the amount B are more than 40% by mass and more than 10% by mass, respectively, the resulting puncture sealant may have deteriorated storage properties, such as easy aggregation of rubber particles during storage, and the puncture sealant may also have increased viscosity and thereby become difficult to inject through the air valve. Thus, the sum of the amounts A and B (amount A+B (solids)) per total mass (100% by mass) of the puncture sealant is preferably in the range from 15 to 60% by mass. The lower limit of the amount A+B (solids) is more preferably 30% by mass or more, while the upper limit thereof is more preferably 50% by mass or less.

Suitable examples of the emulsifiers for the rubber latex and for the tackifying resin emulsion include surfactants such as anionic surfactants, nonionic surfactants, and cationic surfactants. The combined amount of such emulsifying agents per total mass (100% by mass) of the puncture sealant is about 0.4 to 2.0% by mass.

In the present invention, 1,3-propanediol is used as an antifreezing agent. The use of 1,3-propanediol, instead of propylene glycol (1,2-propanediol), suppresses an increase in low-temperature viscosity, thereby improving the injection properties of the puncture sealant at low temperatures. Thus, the applicable temperature range of the puncture sealant can be extended to the low temperature side, which in integrated puncture repair systems prevents clogging of the valve core when the puncture sealant and air are injected through the valve core at low temperatures. This is presumably because 1,3-propanediol, in which hydroxy groups (—OH) are bonded to the carbon atoms at the 1 and 3 positions, has a smaller dipole moment and thus a smaller hydrogen bond strength than "1,2-", which results in reduction in viscosity.

Moreover, when an antifreezing agent is added to a puncture sealant, the rubber particles may show deteriorated stability and aggregate in some cases. In contrast, in the present invention in which 1,3-propanediol is used, the rubber particles and adhesive particles can be prevented from aggregating around the surface and changing to a creamy mass during long-term storage, and therefore excellent storage properties (storage stability) can be exhibited. Accordingly, the use of 1,3-propanediol solves the problem caused by ethylene glycol (poor storage stability) and the problem caused by propylene glycol (poor low-temperature properties), thus providing a good balance of storage stability and low-temperature properties. Such effects can be only achieved when 1,3-propanediol is used; if a different compound such as butanediol is used as the antifreezing agent, problems such as thickening can occur.

The use of 1,3-propanediol also has a good effect in preventing freezing. Further, its amount can be reduced to the minimum, which prevents the adverse effects of the antifreezing agent on the properties such as puncture sealing properties.

The amount C of 1,3-propanediol per total mass (100% by mass) of the puncture sealant is preferably 30 to 60% by mass. If the amount C is less than 30% by mass, low-temperature viscosity may greatly increase, while if the amount C is more than 60% by mass, the puncture sealant has a lower solids content, possibly resulting in reduction in puncture sealing properties. The lower limit of the amount C is more preferably 35% by mass or more, while the upper limit thereof is more preferably 50% by mass or less.

The amount D of 1,3-propanediol in the liquid component, when expressed per 100% by mass of the liquid component in the puncture sealant, is 55 to 61% by mass. If the amount is less than 55% by mass or more than 61% by mass, low-temperature viscosity may greatly increase. The lower limit of the amount D is more preferably 56% by mass or more, while the upper limit thereof is more preferably 60% by mass or less. The liquid component in the puncture sealant refers to a component other than the solids that exist in a solid state in the sealant. For example, the liquid component includes water in the rubber latex, water in the tackifier latex, antifreezing agents such as 1,3-propanediol, as well as surfactants or others that have been completely dissolved in the liquid component even though they alone are in the form of solids.

The puncture sealant of the present invention preferably further contains a nonionic surfactant. The puncture sealant containing natural rubber latex and the tackifier in combination of 1,3-propanediol may clog when it is used at high temperatures. Such clogging at high temperatures is caused as follows: during the injection of high-pressure air after the injection of the sealant, the sealant attached to the inner walls of the bottle or hose comes in contact with hot air and thereby dries and becomes rubbery, and then it accumulates in the narrow spaces of the channel (e.g., valve core and valve insert), thereby clogging the channel. In the present invention, if a nonionic surfactant is further added, the puncture sealant has improved injection properties at high temperatures and can be prevented from clogging at high temperatures. This is presumably because by adsorbing the nonionic surfactant on the natural rubber particles dispersed by ionic repulsive force of the anionic surfactant, the interparticle potential energy around the particles can be increased, resulting in improved thermal stability. Such an effect can be achieved when a nonionic surfactant is used; if a cationic surfactant or anionic surfactant is added, the sealant can be thickened.

The use of a nonionic surfactant also provides excellent initial sealing properties, sealing force retention properties, and storage stability.

The nonionic surfactant is preferably a polyoxyalkylene alkyl ether and/or a polyoxyalkylene alkenyl ether. In this case, high-temperature injection properties can effectively be improved.

The nonionic surfactant, such as polyoxyalkylene alkyl ether and/or polyoxyalkylene alkenyl ether, preferably has an ethylene oxide structure and/or a propylene oxide structure. Nonionic surfactants having an ethylene oxide structure and/or a propylene oxide structure as a hydrophilic group have increased compatibility with 1,3-propanediol. Preferred among these are ones having an ethylene oxide structure. Moreover, in the nonionic surfactant having an ethylene oxide structure and/or a propylene oxide structure, the average number of moles of added ethylene oxide (EO) and propylene oxide (PO) (the sum of the average numbers of moles of added EO and PO) is preferably 10 or more, and more preferably 13 or more. The average number of moles is also preferably 80 or less, more preferably 60 or less, and still more preferably 40 or less. In this case, compatibility can be increased and high-temperature injection properties can be improved.

Moreover, the carbon number of the alkyl group in the polyoxyalkylene alkyl ether and the carbon number of the alkenyl group in the polyoxyalkylene alkenyl ether are each preferably 10 or greater, and more preferably 12 or greater. The carbon numbers are also each preferably 20 or smaller, and more preferably 18 or smaller. In this case, high-temperature injection properties can effectively be improved.

The polyoxyalkylene alkyl ether and the polyoxyalkylene alkenyl ether may each be a compound represented by the formula (1) below. The use of such a compound improves high-temperature injection properties and, at the same time, provides excellent initial sealing properties, sealing force retention properties, and storage stability.

$$R^1-O-(AO)_n-H \qquad (1)$$

In the formula (1), $R^1$ represents a C4-C24 alkyl group or a C4-C24 alkenyl group; the average number n of moles of added units is 1 to 80; and AOs are the same as or different from one another and each represent a C2-C4 oxyalkylene group.

The carbon number of $R^1$ is preferably 8 or greater, more preferably 10 or greater, and still more preferably 12 or greater. The carbon number of $R^1$ is also preferably 22 or smaller, more preferably 20 or smaller, and still more preferably 18 or smaller.

The number n is preferably 10 or greater, and more preferably 13 or greater. Also, n is preferably 60 or smaller, more preferably 50 or smaller, and still more preferably 40 or smaller.

AO is preferably a C2-C3 oxyalkylene group (oxyethylene group (EO) or oxypropylene group (PO)). If $(AO)_n$ includes two or more types of oxyalkylene groups, the oxyalkylene groups may be arranged blockwise or randomly. When $R^1$ or n is within the range mentioned above, or when AO is EO or PO, the effects of the present invention can be well achieved.

The polyoxyalkylene alkyl ether and the polyoxyalkylene alkenyl ether may each suitably be a compound represented by the following formula (2).

$$R^2-O-(EO)_x(PO)_y-H \qquad (2)$$

In the formula (2), $R^2$ represents a C8-C22 alkyl group or a C8-C22 alkenyl group; EO represents an oxyethylene group; PO represents an oxypropylene group; the average number x of moles of added units is 1 to 60; and the average number y of moles of added units is 0 to 20.

The preferred numerical range of the carbon number of $R^2$ is the same as that of $R^1$. $R^2$ may be linear or branched, and is preferably a linear alkyl or alkenyl group. The number x is preferably 10 or more, and more preferably 13 or more. Also, x is preferably 50 or less, and more preferably 40 or less. The number y is preferably 10 or less, more preferably 4.5 or less, and still more preferably 2.0 or less. Also, y may be 0. When $R^2$, x, or y is within the range mentioned above, the effects of the present invention can be well achieved.

EO and PO may be arranged blockwise or randomly. If EO and PO are arranged blockwise, the number of blocks of EO and the number of blocks of PO may each be one or two or more, as long as the average numbers of moles thereof are each within the range mentioned above. If there are two or more blocks of EO, the number of repeated EO units in one block may be the same as or different from that in another block. Also, if there are two or more blocks of PO, the number of repeated PO units in one block may be the same as or different from that in another block. If EO and PO are randomly arranged, EO and PO may be alternately arranged or disorderly arranged, as long as the average numbers of moles thereof are each within the range mentioned above.

In view of high-temperature injection properties, the nonionic surfactant in the present invention may suitably be a polyoxyethylene alkyl ether and/or a polyoxyethylene alkenyl ether (for example, a compound represented by the formula (2) with y=0). In this case, the average number of moles of added EO, the alkyl group, and the alkenyl group are preferably as mentioned above.

Examples of the polyoxyalkylene alkyl ethers and the polyoxyalkylene alkenyl ethers include polyoxyethylene stearyl ether, polyoxyethylene oleyl ether, polyoxyethylene cetyl ether, polyoxyethylene myristyl ether, polyoxyethylene lauryl ether, polyoxyethylene polyoxypropylene stearyl ether, polyoxyethylene polyoxypropylene oleyl ether, polyoxyethylene polyoxypropylene cetyl ether, polyoxyethylene polyoxypropylene myristyl ether, and polyoxyethylene polyoxypropylene lauryl ether. Preferred among these in view of high-temperature injection properties are polyoxyethylene stearyl ether, polyoxyethylene oleyl ether, and polyoxyethylene lauryl ether.

The nonionic surfactant, such as polyoxyalkylene alkyl ether and/or polyoxyalkylene alkenyl ether, preferably has an HLB value (calculated by Griffin's method) of 12 or greater, and more preferably 13 or greater. The HLB value is also preferably 19 or smaller, and more preferably 17 or smaller. In this case, compatibility can be increased and stability at high temperatures and therefore storage properties and high-temperature injection properties can be improved; in addition, excellent puncture sealing properties, sealing force retention properties, and low-temperature properties can be provided.

Examples of commercially available nonionic surfactants include EMULGEN 320P (formula (2) where $R^2$=stearyl, x=13, y=0), EMULGEN 420 (formula (2) where $R^2$=oleyl, x=20, y=0), EMULGEN 430 (formula (2) where $R^2$=oleyl, x=30, y=0), EMULGEN 150 (formula (2) where $R^2$=lauryl, x=40, y=0), EMULGEN 109P (formula (2) where $R^2$=lauryl, x=9, y=0), EMULGEN 120 (formula (2) where $R^2$=lauryl, x=12, y=0), and EMULGEN 220 (formula (2) 15. where $R^2$=cetyl, x=12, y=0) (all from Kao Corp.).

The amount D of the nonionic surfactant per total mass (100% by mass) of the puncture sealant is preferably 1 to 12% by mass. If the amount D is less than 1% by mass, the effect of preventing clogging at high temperatures may be insufficient. Conversely, if the amount D is more than 12% by mass, sealing properties may be insufficient and viscosity at room temperature may also increase. The lower limit of the amount D is more preferably 1.5% by mass or more, while the upper limit thereof is more preferably 10% by mass or less.

The amount D' of the nonionic surfactant based on 100% by mass of all surfactants present in the puncture sealant is preferably 30% by mass or more, and more preferably 40% by mass or more. In this case, high-temperature injection properties can effectively be improved.

In order to ensure both reduction of the freezing temperature and the effect of suppressing an increase in viscosity at low temperatures while maintaining a good balance therebetween, to extend the applicable temperature range to the low temperature side, to increase high-temperature injection properties, and to ensure stability of the sealant, the sum of the amounts C and D (amount C+D) per total mass (100% by mass) of the puncture sealant is preferably set to 34 to 65% by mass. The lower limit of the amount C+D is more preferably 36% by mass or more, while the upper limit thereof is more preferably 62% by mass or less.

The puncture sealant of the present invention may further contain other components in ranges that do not inhibit the effects of the present invention. The puncture sealant of the present invention may be prepared by usual methods. Specifically, the puncture sealant may be prepared, for example, by mixing the components mentioned above by a conventionally known method.

EXAMPLES

The present invention will be described in greater detail below referring to, but not limited to, examples.

Preparation Example 1

A bacteria-derived proteolytic enzyme was added to field latex (solids content: 30% by mass) and left to stand at 40° C. for 24 hours to give a proteolyzed field latex. This field latex was purified using a rotary flat membrane separation system according to the method disclosed in JP 3350593 A and concentrated to a solids content of 60% by mass to prepare a deproteinized natural rubber latex.

Examples 1 to 28 and Comparative Examples 1 to 11

Puncture sealants were prepared in accordance with the formulations shown in Tables 1 to 4 using a commercially available natural rubber latex (Malaysian HA natural rubber latex, rubber solids content: 60% by mass), the deproteinized natural rubber latex prepared in Preparation Example 1, a carboxy-modified styrene-butadiene rubber (SBR) latex, a carboxy-modified styrene-butadiene rubber (SBR) latex, or a polybutadiene rubber (BR) latex.

The carboxy-modified styrene-butadiene rubber (SBR) latex, the polybutadiene rubber (BR) latex, and the tackifier used are as follows.

Carboxy-modified SBR latex: Nipol LX426 (ZEON Corp., solids content: about 50% by mass)

BR latex: Nipol LX111 A2 (ZEON Corp., solids content: about 50% by mass)

Tackifier: emulsion of terpene resin (solids content: about 50% by mass)

The surfactants used are as follows.

EMULGEN 320P: polyoxyethylene stearyl ether (formula (2) where $R^2$=stearyl, x=13, y=0, HLB value=13.9, Kao Corp.)

EMULGEN 420: polyoxyethylene oleyl ether (formula (2) where $R^2$=oleyl, x=20, y=0, HLB value=13.6, Kao Corp.)

EMULGEN 430: polyoxyethylene oleyl ether (formula (2) where $R^2$=oleyl, x=30, y=0, HLB value=16.2, Kao Corp.)

EMULGEN 150: polyoxyethylene lauryl ether (formula (2) where $R^2$=lauryl, x=40, y=0, HLB value=18.4, Kao Corp.)

EMAL 270J: sodium polyoxyethylene lauryl ether sulfate (Kao Corp.)

EMAL 2FG: sodium lauryl sulfate (Kao Corp.)

The prepared puncture sealants were evaluated by the following methods with respect to puncture sealing properties, sealing force retention properties, storage properties (storage stability), low-temperature viscosity (at −40° C.), and high-temperature injection properties. The results are shown in Tables 1 to 4.

(1) Puncture Sealing Properties

A puncture hole was made in a tire of size 185/65R14 using a nail having a diameter of 4.0 mm. After the nail was removed, 500 ml of the puncture sealant was injected into the tire and air pressure was applied up to 200 kPa. Then, the tire was run on a drum at a load of 3.5 kN for 10 minutes. After the running, whether the puncture hole was sealed or not was assessed on a two point scale (Good/Poor).

(2) Sealing Force Retention Properties

The above tire was used to determine whether or not air leaked from the puncture hole during 100-km running after the sealing. The air leakage was assessed on a two point scale (Good (air not leaked), Poor (air leaked)).

(3) Storage Properties (Storage Stability)

A 500-ml portion of the puncture sealant prepared was put in a bottle-like container and then stored at rest in an 80° C. oven for two months. The amount of creamy mass generated after the storage was measured and expressed as a ratio by mass (%) to the total amount of the puncture sealant.

(4) Low-temperature Viscosity (at −40° C.)

Using a type B viscometer (Brookfield viscometer), the viscosity of the puncture sealant at −40° C. was measured.

(5) High-temperature Injection Properties

The puncture sealant was injected using an integrated puncture repair system in an atmosphere at 50° C. High-temperature injection properties were determined by whether or not the tire pressure increased to a predetermined level. The results were assessed on a two point scale (Good (increased), Poor (not increased)).

TABLE 1

| | Example No. | 1 | 2 | 3 | 4 | 5 | 6 |
|---|---|---|---|---|---|---|---|
| Component | Natural rubber latex (Solids content: 60%) | 30 (18) | 25 (15) | 20 (12) | 15 (9) | | |
| | Deproteinized natural rubber latex (Solids content: 60%) | | | | | 30 (18) | 25 (15) |
| | SBR latex (Solids content: 50%) | | | | | | |
| | BR latex (Solids content: 54%) | | | | | | |
| | Tackifier (Solids content: 50%) | 10 (5) | 10 (5) | 10 (5) | 10 (5) | 10 (5) | 10 (5) |
| | 1,3-Propanediol | 45 | 48 | 50 | 52 | 45 | 48 |
| | Ethylene glycol | | | | | | |
| | Ion exchange water | 15 | 17 | 20 | 23 | 15 | 17 |
| Amount | Solids (g) | 23 | 20 | 17 | 14 | 23 | 20 |
| | Water content (g) | 32 | 32 | 33 | 34 | 32 | 32 |
| | Antifreezing agent (g) | 45 | 48 | 50 | 52 | 45 | 48 |
| | Proportion of solids (mass %) | 29.9% | 25.0% | 20.5% | 16.3% | 29.9% | 25.0% |
| | Proportion of antifreezing agent (mass %) | 58.4% | 60.0% | 60.2% | 60.5% | 58.4% | 60.0% |
| Evaluation of physical properties | Puncture sealing properties | Good | Good | Good | Good | Good | Good |
| | Sealing force retention properties | Good | Good | Good | Good | Good | Good |
| | Storage properties (%) | 11 | 10 | 10 | 11 | 11 | 12 |
| | Viscosity at −40° C. (cps) | 2400 | 2100 | 1800 | 1600 | 2300 | 2000 |

| | Example No. | 7 | 8 | 9 | 10 | 11 | 12 |
|---|---|---|---|---|---|---|---|
| Component | Natural rubber latex (Solids content: 60%) | | | | | | |
| | Deproteinized natural rubber latex (Solids content: 60%) | 20 (12) | 15 (9) | | | | |
| | SBR latex (Solids content: 50%) | | | 25 (12.5) | 20 (10) | | |
| | BR latex (Solids content: 54%) | | | | | 25 (13.5) | 20 (10.8) |
| | Tackifier (Solids content: 50%) | 10 (5) | 10 (5) | 10 (5) | 10 (5) | 10 (5) | 10 (5) |
| | 1,3-Propanediol | 50 | 52 | 48 | 50 | 52 | 50 |
| | Ethylene glycol | | | | | | |
| | Ion exchange water | 20 | 23 | 17 | 20 | 18 | 20 |
| Amount | Solids (g) | 17 | 14 | 17.5 | 15 | 18.5 | 15.8 |
| | Water content (g) | 33 | 34 | 34.5 | 35 | 34.5 | 34.2 |
| | Antifreezing agent (g) | 50 | 52 | 48 | 50 | 52 | 50 |
| | Proportion of solids (mass %) | 20.5% | 16.3% | 21.2% | 17.6% | 21.4% | 18.8% |
| | Proportion of antifreezing agent (mass %) | 60.2% | 60.5% | 58.2% | 58.8% | 60.1% | 59.4% |
| Evaluation of physical properties | Puncture sealing properties | Good | Good | Good | Good | Good | Good |
| | Sealing force retention properties | Good | Good | Good | Good | Good | Good |
| | Storage properties (%) | 11 | 12 | 10 | 9 | 10 | 9 |
| | Viscosity at −40° C. (cps) | 1800 | 1600 | 1900 | 1800 | 2000 | 1800 |

TABLE 2

| | | Example | | Comparative Example | | | |
|---|---|---|---|---|---|---|---|
| | Example No. | 13 | 14 | 1 | 2 | 3 | 4 |
| Component | Natural rubber latex (Solids content: 60%) | 40 (24) | 35 (21) | 30 (18) | 30 (18) | | |
| | Deproteinized natural rubber latex (Solids content: 60%) | | | | | 30 (18) | 30 (18) |
| | SBR latex (Solids content: 50%) | | | | | | |
| | BR latex (Solids content: 54%) | | | | | | |
| | Tackifier (Solids content: 50%) | 10 (5) | 10 (5) | 10 (5) | 10 (5) | 10 (5) | 10 (5) |
| | 1,3-Propanediol | 41 | 43 | 50 | 41 | 50 | 40 |
| | Ethylene glycol | | | | | | |
| | Ion exchange water | 9 | 12 | 10 | 19 | 10 | 20 |
| Amount | Solids (g) | 29 | 26 | 23 | 23 | 23 | 23 |
| | Water content (g) | 30 | 31 | 27 | 36 | 27 | 37 |
| | Antifreezing agent (g) | 41 | 43 | 50 | 41 | 50 | 40 |

TABLE 2-continued

|  |  | | | | | | |
|---|---|---|---|---|---|---|---|
| Evaluation of physical properties | Proportion of solids (mass %) | 40.8% | 35.1% | 29.9% | 29.9% | 29.9% | 29.9% |
|  | Proportion of antifreezing agent (mass %) | 57.7% | 58.1% | 64.9% | 53.2% | 64.9% | 51.9% |
|  | Puncture sealing properties | Good | Good | Good | Good | Good | Good |
|  | Sealing force retention properties | Good | Good | Good | Good | Good | Good |
|  | Storage properties (%) | 11 | 11 | 11 | 10 | 12 | 11 |
|  | Viscosity at −40° C. (cps) | 3200 | 2800 | 4100 | 4800 | 4700 | 5400 |

|  |  | Comparative Example | | | | |
|---|---|---|---|---|---|---|
|  | Example No. | 5 | 6 | 7 | 8 | 9 |
| Component | Natural rubber latex |  |  |  |  | 30 |
|  | (Solids content: 60%) |  |  |  |  | (18) |
|  | Deproteinized natural rubber latex |  |  |  |  |  |
|  | (Solids content: 60%) |  |  |  |  |  |
|  | SBR latex | 30 | 30 |  |  |  |
|  | (Solids content: 50%) | (15) | (15) |  |  |  |
|  | BR latex |  |  | 30 | 30 |  |
|  | (Solids content: 54%) |  |  | (13.5) | (13.5) |  |
|  | Tackifier | 10 | 10 | 10 | 10 | 10 |
|  | (Solids content: 50%) | (5) | (5) | (5) | (5) | (5) |
|  | 1,3-Propanediol | 50 | 43 | 50 | 42 |  |
|  | Ethylene glycol |  |  |  |  | 55 |
|  | Ion exchange water | 10 | 17 | 10 | 18 | 10 |
| Amount | Solids (g) | 20 | 20 | 21.2 | 21.2 | 23 |
|  | Water content (g) | 30 | 37 | 28.8 | 36.8 | 27 |
|  | Antifreezing agent (g) | 50 | 43 | 50 | 42 | 55 |
|  | Proportion of solids (mass %) | 25.0% | 25.0% | 26.9% | 26.9% | 28.0% |
|  | Proportion of antifreezing agent (mass %) | 62.5% | 53.8% | 63.5% | 53.3% | 67.1% |
| Evaluation of physical properties | Puncture sealing properties | Good | Good | Good | Good | Good |
|  | Sealing force retention properties | Good | Good | Good | Good | Good |
|  | Storage properties (%) | 11 | 10 | 10 | 10 | 16 |
|  | Viscosity at −40° C. (cps) | 4500 | 6100 | 4300 | 5800 | 1800 |

As shown in Tables 1 and 2, in Comparative Example 9 using ethylene glycol as the antifreezing agent, poor storage properties were exhibited. Even when 1,3-propanediol was used, its use in a proportion of less than 55% by mass or more than 61% by mass resulted in high low-temperature viscosity and poor low-temperature properties. In contrast, the puncture sealants of Examples 1 to 14 with a proportion of 1,3-propanediol of at least 55% but not more than 61% were excellent in both of these properties. The sealants were also excellent in puncture sealing properties and sealing force retention properties.

TABLE 3

|  |  | Example | | | | |
|---|---|---|---|---|---|---|
|  | Example No. | 15 | 16 | 17 | 18 | 19 |
| Component | Natural rubber latex | 25 | 25 | 25 | 25 |  |
|  | (Solids content: 60%) | (15) | (15) | (15) | (15) |  |
|  | Deproteinized natural rubber latex |  |  |  |  | 25 |
|  | (Solids content: 60%) |  |  |  |  | (15) |
|  | Tackifier | 10 | 10 | 10 | 10 | 10 |
|  | (Solids content: 50%) | (5) | (5) | (5) | (5) | (5) |
|  | 1,3-Propanediol | 48 | 48 | 48 | 48 | 48 |
|  | EMULGEN 320P | 2 |  |  |  | 2 |
|  | EMULGEN 420 |  | 2 |  |  |  |
|  | EMULGEN 430 |  |  | 2 |  |  |
|  | EMULGEN 150 |  |  |  | 2 |  |
|  | Ion exchange water | 17 | 17 | 17 | 17 | 17 |
| Amount | Solids (g) | 20 | 20 | 20 | 20 | 20 |
|  | Water content (g) | 32 | 32 | 32 | 32 | 32 |
|  | Antifreezing agent (g) | 48 | 48 | 48 | 48 | 48 |
|  | Proportion of solids (mass %) | 25.0% | 25.0% | 25.0% | 25.0% | 25.0% |
|  | Proportion of antifreezing agent (mass %) | 58.5% | 58.5% | 58.5% | 58.5% | 58.5% |
| Evaluation of physical properties | Puncture sealing properties | Good | Good | Good | Good | Good |
|  | Sealing force retention properties | Good | Good | Good | Good | Good |
|  | Storage properties (%) | 10 | 9 | 9 | 11 | 11 |
|  | Viscosity at −40° C. (cps) | 1700 | 1750 | 1700 | 1750 | 1900 |
|  | High-temperature injection properties | Good | Good | Good | Good | Good |

TABLE 3-continued

|  |  | Example | | | | |
|---|---|---|---|---|---|---|
|  | Example No. | 20 | 21 | 22 | 23 | 24 |
| Component | Natural rubber latex |  |  |  | 25 | 25 |
|  | (Solids content: 60%) |  |  |  | (15) | (15) |
|  | Deproteinized natural rubber latex | 25 | 25 | 25 |  |  |
|  | (Solids content: 60%) | (15) | (15) | (15) |  |  |
|  | Tackifier | 10 | 10 | 10 | 10 | 10 |
|  | (Solids content: 50%) | (5) | (5) | (5) | (5) | (5) |
|  | 1,3-Propanediol | 48 | 48 | 48 | 48 | 48 |
|  | EMULGEN 320P |  |  |  | 1 | 5 |
|  | EMULGEN 420 | 2 |  |  |  |  |
|  | EMULGEN 430 |  | 2 |  |  |  |
|  | EMULGEN 150 |  |  | 2 |  |  |
|  | Ion exchange water | 17 | 17 | 17 | 17 | 17 |
| Amount | Solids (g) | 20 | 20 | 20 | 20 | 20 |
|  | Water content (g) | 32 | 32 | 32 | 32 | 32 |
|  | Antifreezing agent (g) | 48 | 48 | 48 | 48 | 48 |
|  | Proportion of solids (mass %) | 25.0% | 25.0% | 25.0% | 25.0% | 25.0% |
|  | Proportion of antifreezing agent (mass %) | 58.5% | 58.5% | 58.5% | 59.3% | 56.5% |
| Evaluation of physical properties | Puncture sealing properties | Good | Good | Good | Good | Good |
|  | Sealing force retention properties | Good | Good | Good | Good | Good |
|  | Storage properties (%) | 9 | 10 | 10 | 10 | 10 |
|  | Viscosity at −40° C. (cps) | 2000 | 1950 | 2000 | 1900 | 1800 |
|  | High-temperature injection properties | Good | Good | Good | Good | Good |

TABLE 4

|  |  | Comparative Example | | Example | | | |
|---|---|---|---|---|---|---|---|
|  | Example No. | 10 | 11 | 25 | 26 | 27 | 28 |
| Component | Natural rubber latex | 25 | 25 | 25 | 25 |  |  |
|  | (Solids content: 60%) | (15) | (15) | (15) | (15) |  |  |
|  | Deproteinized natural rubber latex |  |  |  |  | 25 | 25 |
|  | (Solids content: 60%) |  |  |  |  | (15) | (15) |
|  | Tackifier | 10 | 10 | 10 | 10 | 10 | 10 |
|  | (Solids content: 50%) | (5) | (5) | (5) | (5) | (5) | (5) |
|  | 1,3-Propanediol | 55 | 40 | 48 | 48 | 48 | 48 |
|  | EMULGEN 320P | 2 |  |  |  |  |  |
|  | EMULGEN 420 |  | 2 |  |  |  |  |
|  | EMAL 270J |  |  | 2 |  | 2 |  |
|  | EMAL 2FG |  |  |  | 2 |  | 2 |
|  | Ion exchange water | 10 | 25 | 17 | 17 | 17 | 17 |
| Amount | Solids (g) | 20 | 20 | 20 | 20 | 20 | 20 |
|  | Water content (g) | 25 | 40 | 32 | 32 | 32 | 32 |
|  | Antifreezing agent (g) | 55 | 40 | 48 | 48 | 48 | 48 |
|  | Proportion of solids (mass %) | 25.0% | 25.0% | 25.0% | 25.0% | 25.0% | 25.0% |
|  | Proportion of antifreezing agent (mass %) | 67.1% | 48.8% | 58.5% | 58.5% | 58.5% | 58.5% |
| Evaluation of physical properties | Puncture sealing properties | Good | Good | Good | Good | Good | Good |
|  | Sealing force retention properties | Good | Good | Good | Good | Good | Good |
|  | Storage properties (%) | 10 | 9 | 11 | 11 | 12 | 12 |
|  | Viscosity at −40° C. (cps) | 5400 | 6500 | 1900 | 2000 | 2100 | 2200 |
|  | High-temperature injection properties | Good | Good | Poor | Poor | Poor | Poor |

As shown in Tables 3 and 4, in Examples 15 to 24 having a proportion of 1,3-propanediol of 55 to 61% by mass and also containing a nonionic surfactant, low-temperature viscosity could be greatly reduced while ensuring puncture sealing properties, sealing force retention properties, and storage properties, and good high-temperature injection properties were also exhibited. Therefore, these puncture sealants can suitably be used in integrated systems over a wide range from low to high temperatures.

The invention claimed is:

1. A tire puncture sealant, comprising rubber latex, 1,3-propanediol, and a nonionic surfactant, the 1,3-propanediol being present in a proportion of 58.2 to 61% by mass of the liquid component in the tire puncture sealant.

2. The tire puncture sealant according to claim 1, which has a solids content of 15 to 30% by mass.

3. The puncture sealant according to claim 1, wherein the rubber latex is natural rubber latex.

4. The tire puncture sealant according to claim 3, wherein the natural rubber latex is deproteinized natural rubber.

5. The tire puncture sealant according to claim 1, further comprising a tackifying resin emulsion.

6. The tire puncture sealant according to claim 1, wherein the nonionic surfactant is at least one of a polyoxyalkylene alkyl ether and a polyoxyalkylene alkenyl ether.

7. The tire puncture sealant according to claim 1, wherein the nonionic surfactant has at least one of an ethylene oxide structure and a propylene oxide structure.

8. The tire puncture sealant according to claim 7, wherein the average number of moles of added ethylene oxide or propylene oxide is 10 or greater.

9. The tire puncture sealant according to claim 7, wherein the polyoxyalkylene alkyl ether comprises an alkyl group having 10 or more carbon atoms.

10. The tire puncture sealant according to claim 7, wherein the polyoxyalkylene alkenyl ether comprises an alkenyl group having 10 or more carbon atoms.

11. The tire puncture sealant according to claim 1, wherein the nonionic surfactant is at least one selected from the group consisting of polyoxyethylene stearyl ether, polyoxyethylene lauryl ether, and polyoxyethylene oleyl ether.

12. The tire puncture sealant according to claim 1, wherein the nonionic surfactant has an HLB value of 12 or greater.

13. The tire puncture sealant according to claim 1, wherein the sealant has a solids content of 15 to 30% by mass, the natural rubber latex is deproteinized natural rubber, and the nonionic surfactant is at least one of a polyoxyalkylene alkyl ether and a polyoxyalkylene alkenyl ether.

\* \* \* \* \*